US012056891B2

(12) United States Patent
Wawruch

(10) Patent No.: US 12,056,891 B2
(45) Date of Patent: Aug. 6, 2024

(54) AUGMENTED REALITY IMAGE REPRODUCTION ASSISTANT

(71) Applicant: Snap Inc., Santa Monica, CA (US)

(72) Inventor: Pawel Wawruch, Yverdon-les-Bains (CH)

(73) Assignee: Snap Inc., Santa Monica, CA (US)

( * ) Notice: Subject to any disclaimer, the term of this patent is extended or adjusted under 35 U.S.C. 154(b) by 108 days.

(21) Appl. No.: 17/852,134

(22) Filed: Jun. 28, 2022

(65) Prior Publication Data
US 2023/0419530 A1    Dec. 28, 2023

(51) Int. Cl.
*G06T 19/20* (2011.01)
*G06T 7/70* (2017.01)
*G06T 19/00* (2011.01)

(52) U.S. Cl.
CPC .............. *G06T 7/70* (2017.01); *G06T 19/006* (2013.01); *G06T 19/20* (2013.01)

(58) Field of Classification Search
CPC ........ G06F 3/011; G06F 3/017; G06T 19/006; G06T 2207/30204; G06T 19/20; G06T 7/62; G09G 2340/10; G09G 5/373; G09G 2356/00
See application file for complete search history.

(56) References Cited

U.S. PATENT DOCUMENTS

| 10,241,588 | B1* | 3/2019 | Misra | .................... G06T 19/006 |
| 2003/0227470 | A1 | 12/2003 | Genc et al. | |
| 2019/0197725 | A1 | 6/2019 | Dagley et al. | |
| 2019/0197750 | A1 | 6/2019 | Dagley et al. | |
| 2020/0363931 | A1 | 11/2020 | Drobitko et al. | |
| 2021/0278908 | A1* | 9/2021 | Gafni | .................. G06V 10/7788 |
| 2022/0318550 | A1* | 10/2022 | St. Amant | .............. G06V 20/20 |

FOREIGN PATENT DOCUMENTS

KR    20170113946    10/2017

OTHER PUBLICATIONS

"International Application Serial No. PCT/US2023/068801, International Search Report mailed Oct. 25, 2023", 3 pgs.
"International Application Serial No. PCT/US2023/068801, Written Opinion mailed Oct. 25, 2023", 4 pgs.

* cited by examiner

*Primary Examiner* — Hau H Nguyen
(74) *Attorney, Agent, or Firm* — Schwegman Lundberg & Woessner, P.A.

(57) ABSTRACT

An image copying assistant is a computing application configured to aid users in copying a digital image to a physical canvas using traditional media on the physical canvas. The image copying assistant utilizes augmented reality techniques to present features of the digital image projected onto the physical canvas. The image copying assistant detects previously generated markers in an output of a digital image sensor of a camera of a computing device and use the detected markers to calculate the plane and boundaries of the surface of the physical canvas. The image copying assistant uses the calculated plane and boundaries to determine a position of the digital image on a display of the computing device.

20 Claims, 8 Drawing Sheets

AUGMENTED REALITY IMAGE REPRODUCTION ASSISTANT

TECHNICAL FIELD

The present disclosure relates generally to facilitating augmented reality experiences.

BACKGROUND

As the popularity of computer-implemented tools that permit users to access and interact with content and other users online continues to grow, various computer-implemented tools are being developed to permit users to share content with other users through messaging clients. Some of such computer-implemented applications, termed apps, can be designed to run on a mobile device such as a phone, a tablet, or a wearable device, while having a backend service provided on a server computer system to perform operations that may require resources greater than is reasonable to perform at a client device (e.g., storing large amounts of data or performing computationally expensive processing). Various computer-implemented tools are being developed to permit users to experience so called augmented reality. Augmented reality, often abbreviated as AR, is an environment, in which the real world, as viewed through a camera lens, for example, is augmented by overlaying digital content over the view of the real world presented on the display of a user device. Examples of user devices include AR glasses, a tablet, and a smartphone.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
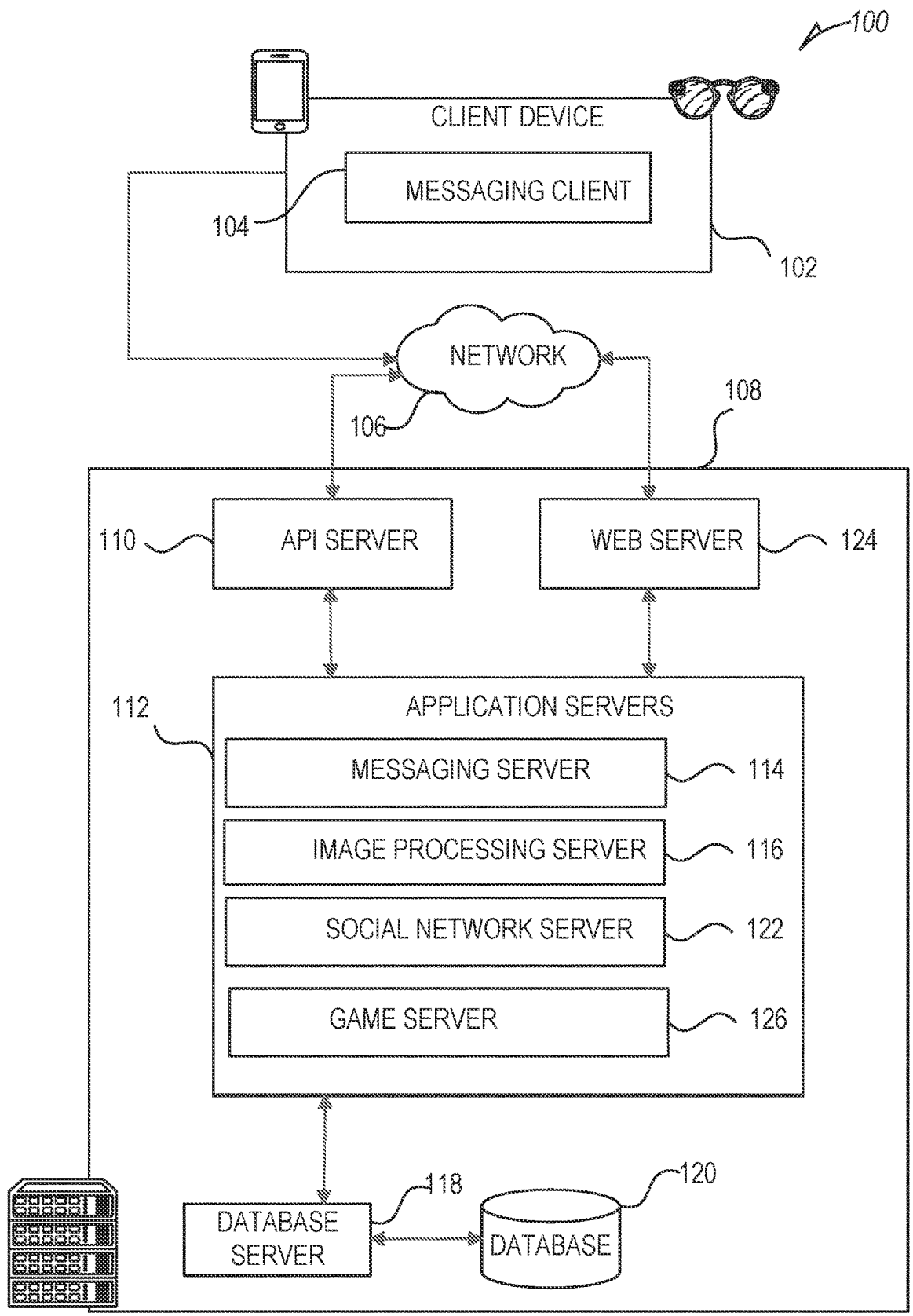
FIG. 1 is a diagrammatic representation of a networked environment in which a location-based shared augmented reality (AR) experience system may be deployed, in accordance with some examples.

Embodiments of the present disclosure improve the functionality of computer systems by enhancing usability of augmented reality (AR) software and systems.

An AR-enabled computing application is configured to execute at a user device, such as a tablet, a smartphone or AR glasses. AR glasses, also referred to as AR smart glasses or merely smart glasses, are computing devices that are wearable in the same manner as a pair of glasses. AR glasses are equipped with a digital camera and digital displays, and permit the wearer to see, through the glasses' lenses, the real world as augmented by overlayed computer-generated information. Augmentation of the real-world view by overlayed computer-generated information can be achieved by combining transparent lenses with digital displays, such as light-emitting diode (LED) or organic light-emitting diode (OLED) displays. For example, the digital displays of the AR glasses may display an AR overlay (a digital image of a magical creature, for example) as if it is positioned in real life in front of the wearer of the AR glasses.

An AR-enabled computing application may be configured to display a source image on the display of the AR glasses in a manner that it would appear to the wearer of the AR glasses as overlaid over or projected onto a physical canvas. The projection of a source image onto the physical canvas may be helpful in aiding the wearer of the AR glasses in copying the source image on the physical canvas using physical media such as oil paints or watercolors.

In some examples, a source image is displayed on the display of the AR glasses at a position that is calculated based on the representation of the physical canvas in the output of the digital image sensor of a camera of the AR glasses. Computer-generated information provided on the display of the AR glasses is referred to as a digital layer, for the purposes of this description. The digital layer may include the source image positioned on the display of the AR glasses as overlaid over a physical canvas. The portion of the digital layer that includes the source image positioned on the display of the AR glasses as overlaid over a physical canvas may be referred to as a digital canvas. To aid the wearer of the AR glasses in copying the source image on the physical canvas, it is important that the digital layer containing the source image matches the plane and dimensions of the physical canvas with greater precision as compared to some other AR-enabled applications, because even a small shift off the surface of the canvas may make the projection of the source image useless for the purposes of copying.

The technical challenge of stabilizing the detection of the plane and dimensions of the physical canvas, in order to maintain the position of the source image on the display with respect to the physical canvas is addressed by providing an AR-enabled computing application referred to as an image copying assistant.

The image copying assistant is configured to detect, in the output of the digital image sensor of a camera of a user device, previously generated markers and use the detected markers to calculate the plane and boundaries of the surface of the physical canvas and, based on the calculated plane and boundaries, construct the digital canvas. The constructed digital canvas is aligned with the physical canvas viewed by the user through the AR glasses.

The image copying assistant may be configured to use, as a marker, a previously generated quick response (QR) code.

Physical labels depicting the QR codes may be attached to the frame holding the physical canvas or to the corners of the physical canvas using pins, for example. The QR code may include instructions for calculating the plane and boundaries that describe an associated physical surface. For example, a QR code may include instructions for calculating the plane using three points. In another example, where a user affixes four markers (labels depicting a QR code), the QR code includes instructions for calculating the plane using four points. More markers can also be used, in some embodiments, such as at the corners of the physical canvas and in the middle of the edges. For the purposes of this description, the phrase physical canvas refers to any surface, on which the image is overlaid in order to help the user paint or draw the image on that physical surface.

In some examples, the image copying assistant is provided by a messaging system configured to facilitate network communication between user devices.

Networked Computing Environment

FIG. 1 is a block diagram 100 showing an example messaging system for exchanging data (e.g., messages and associated content) over a network. The messaging system includes multiple instances of a messaging client 104 executing at respective client devices such as a client device 102 and a messaging server system 108. Each messaging client 104 is communicatively coupled to other instances of the messaging client 104 and a messaging server system 108 via a network 106 (e.g., the Internet). The client device 102 is a smartphone, AR glasses or another type of device that is able to display AR content.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using customized image reprocessing. Data exchanges within the messaging system are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols. The web server 124, in some examples, hosts a backend for the image copying assistant described herein.

The Application Program Interface (APT) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, collectively referred to as an AR engine, which can be hosted or supported by the image processing server 116. An AR engine, in some examples, is used to facilitate the functionality provided by the image copying assistant, which is described herein.

Figure 3:
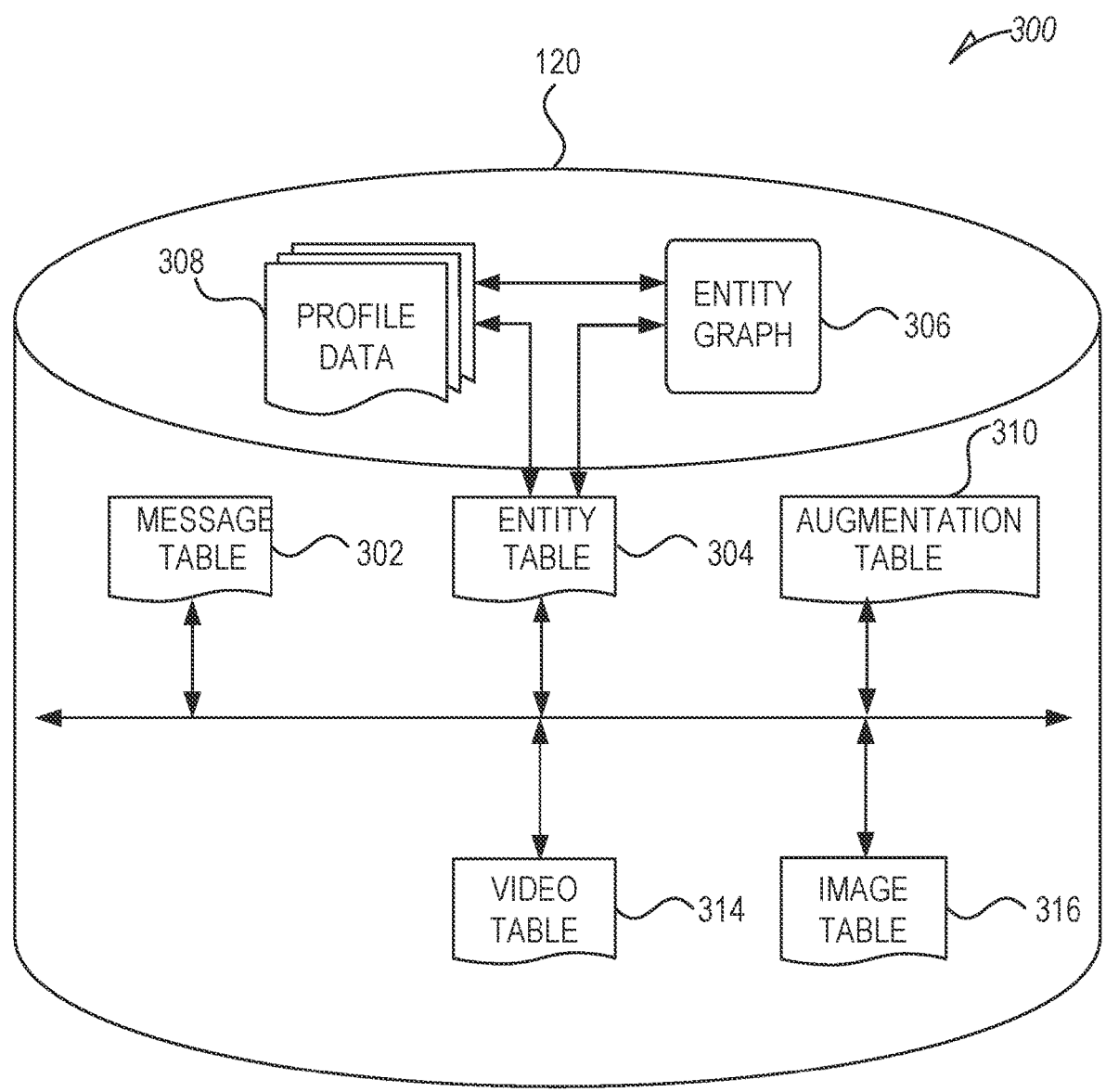
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system with which a particular user has a "friend" relationship or is "following," and also the identification of other entities and interests of a particular user.

The game server 126, in some examples, is configured as the authoritative source of user actions and the effects of user actions, also referred as events, in a multiplayer game. The game server 126 being the authoritative source of events in a multiplayer game means that each user device engaged in the same multiplayer game maintains a version of the state of the game, which is consistent with the respective versions of the state of the game available to other users via their respective user devices. In some examples, a multi-player game is an AR experience shared by multiple users. As mentioned above, the users participating in a shared AR experience session are interacting in the real world, in that they are located in substantially the same geographic area such that they can see the same real-world objects around them, even if from different angle, while also being able to manipulate the virtual object provided by the shared AR experience by interacting with the activity UI of the shared UI experience.

System Architecture

Figure 2:
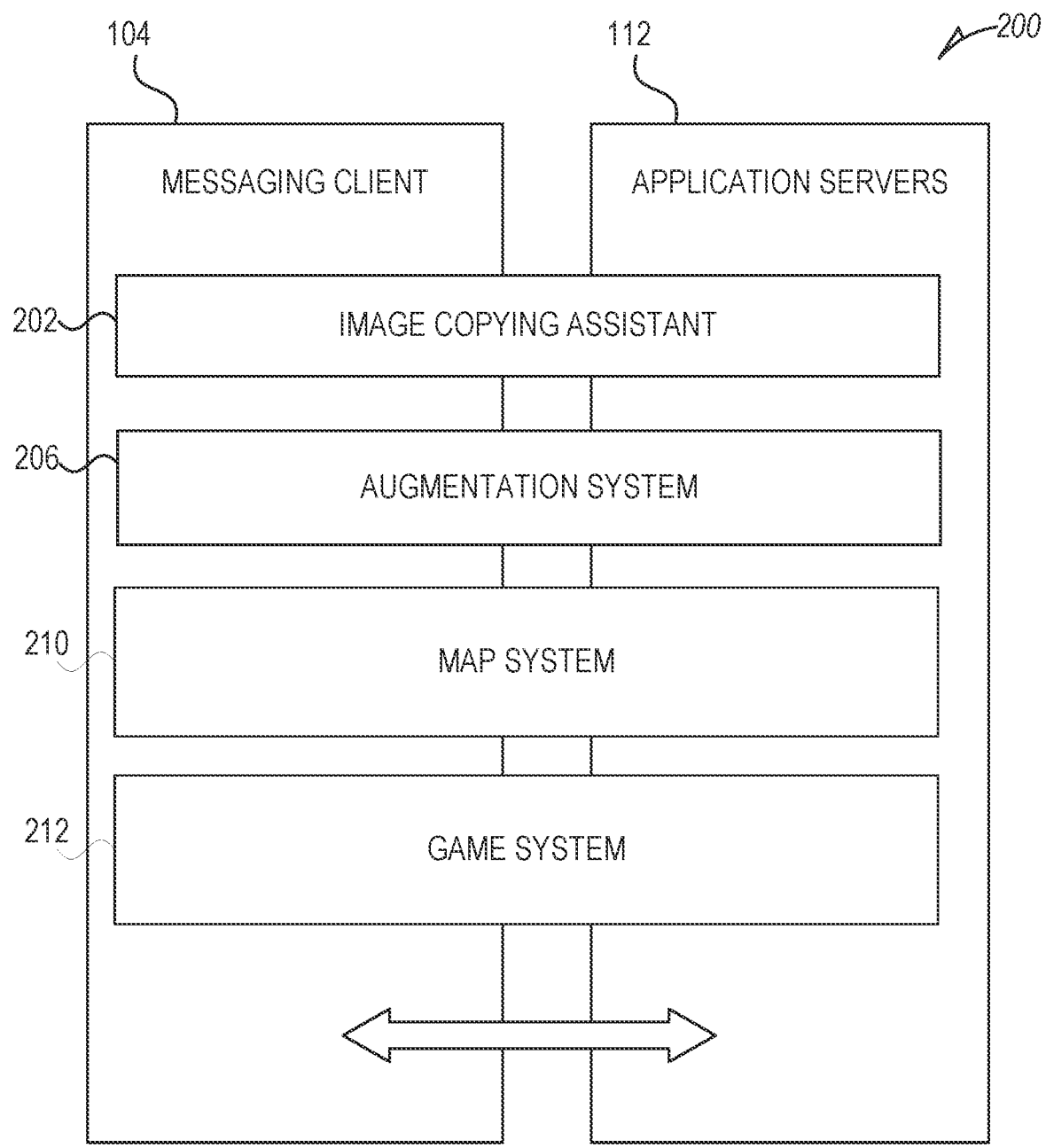
FIG. 2 is a diagrammatic representation of a messaging system, in accordance with some examples, that has both client-side and server-side functionality, and that includes a location-based shared AR experience system.

FIG. 2 is a block diagram 200 illustrating further details regarding the messaging system, according to some examples. Specifically, the messaging system is shown to comprise the messaging client 104 and the application servers 112. The messaging system embodies a number of subsystems, which are supported on the client-side by the messaging client 104, and on the sever-side by the application servers 112. These subsystems include, for example a image copying assistant 202, an augmentation system 206, a map system 210, and a game system 212.

The image copying assistant 202 is configured to detect, in an output of a digital image sensor of a camera of the user device, several copies of a visual marker and calculate a plane and boundaries of the physical canvas represented in the output of the digital image sensor. Based on the detected copies of the visual marker the image copying assistant 202 detects a position for a source image on a display of the user device based on the calculated plane and boundaries, and cause displaying of the source image at the determined position.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system. The media overlays may be stored in the database 120 and accessed through the database server 118.

In some examples, the augmentation system 206 is configured to provide access to AR components that can be implemented using a programming language suitable for application development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement. In some embodiments, the augmentation system 206 is used by the image copying assistant 202 as an AR engine to facilitate detecting several copies of a previously generated visual marker in an output of a digital image sensor of a camera of a user device.

The map system 210 provides various geographic location functions, and supports the presentation of map-based media content and messages by the messaging client 104. For example, the map system 210 enables the display of user icons or avatars (e.g., stored in profile dat for a 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100, including AR experiences that may be facilitated by the image copying assistant 202.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

Figure 4:
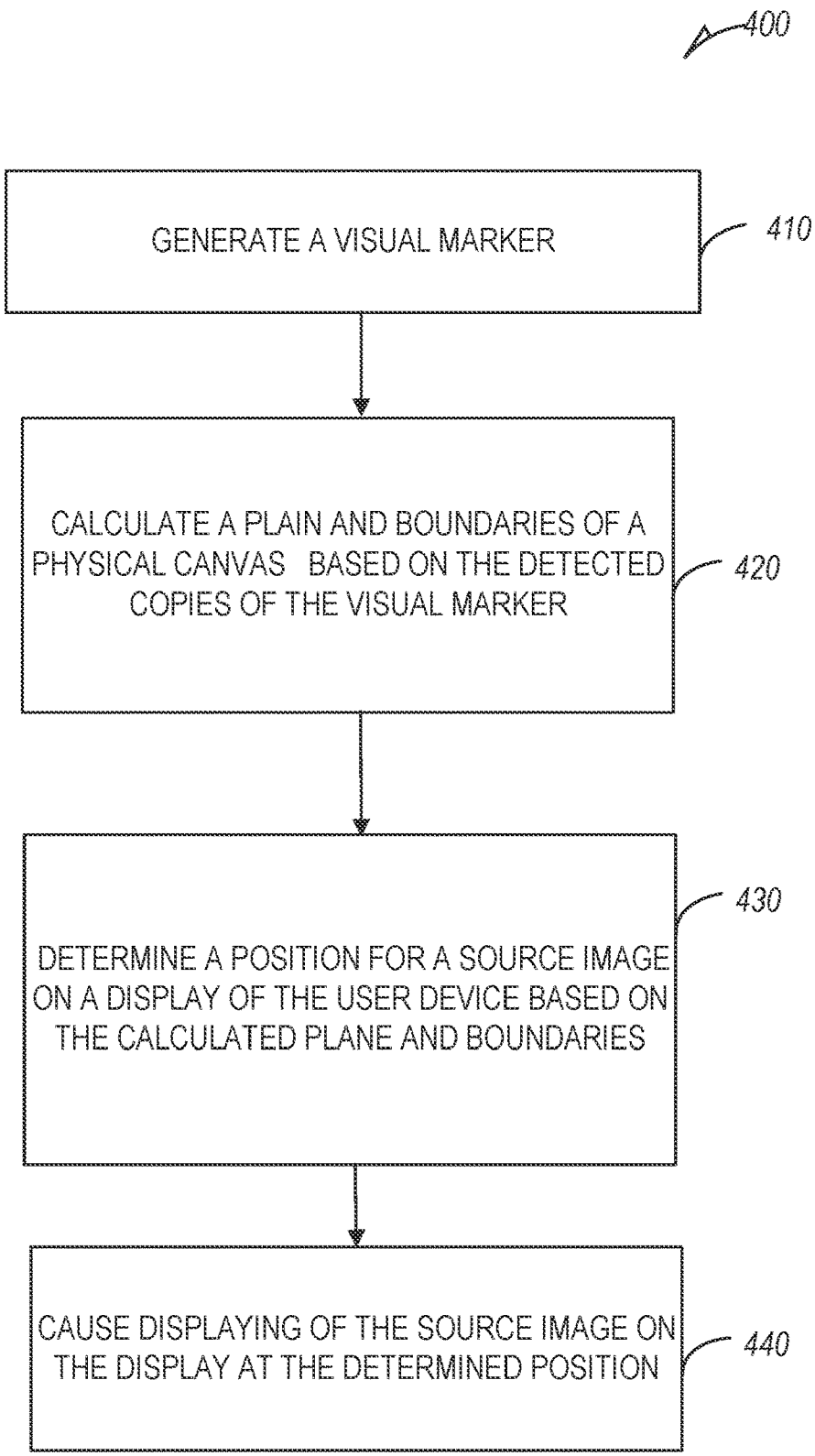
FIG. 4 is a flowchart of a method performed by an image copying assistant, in accordance with some examples.

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. As explained above, users in the messaging system are represented by respective profiles storing information pertaining to the associated users. The profile data 308 may be selectively used and presented to other users of the messaging system, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). The profile data 308 may include information about a user that can be accessed by the image copying assistant 202. Information about a user that can be accessed by the image copying assistant 202 include, for example, saved image copying sessions generated by the image copying assistant 202.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a source image, which may be the subject of a copying process aided by the image copying assistant 202.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Process Flow

In one example embodiment, some or all processing logic resides at the client device 102 of FIG. 1 and/or at the messaging server system 108 of FIG. 1. The method 400 commences at operation 410, when the image copying assistant 202 of FIG. 2 generates a visual marker that can be used in the process of AR-aided copying. In one example, the marker is a QR code or a high-resolution image that has a lot of detail and contrast. In examples, in which the marker is a QR code, the QR code includes instructions for calculating the plane and boundaries of the surface of the physical canvas, using a predetermined number of reference points.

At operation 420, the image copying assistant 202 detects, in an output of a digital image sensor of a camera of the user device, several copies of the visual marker. The copies of the visual marker could be printed on physical labels and manually attached to the corners of the physical canvas.

At operation 430, the image copying assistant 202 calculates a plane and boundaries of the physical canvas represented in the output of the digital image sensor, based on the detected copies of the visual marker. For example, the image copying assistant 202 uses a reverse linear transformation to calculate the projection matrix and then apply the projection matrix to the source image in order to cast it onto the display of the user device.

At operation 430, the image copying assistant 202 determines a position for a source image on a display of the user device based on the calculated plane and boundaries. In one example, the source image is a digital image previously uploaded to the user device. At operation 440, the image copying assistant 202 causes displaying of the source image on the display at the determined position.

In some examples, the image copying assistant 202 causes displaying, on the display of the user device, a user-selectable element activatable to change brightness of the source image. The user-selectable element may be configured to be activated in response to a gesture or a voice command detected at the user device. In order to optimize the energy usage by the user device, the image copying assistant 202 may be configured to turn off the display of the user device after a predetermined period of time and to turn the display back on in response to a predetermined gesture or a voice command.

User Interfaces

Figure 5:
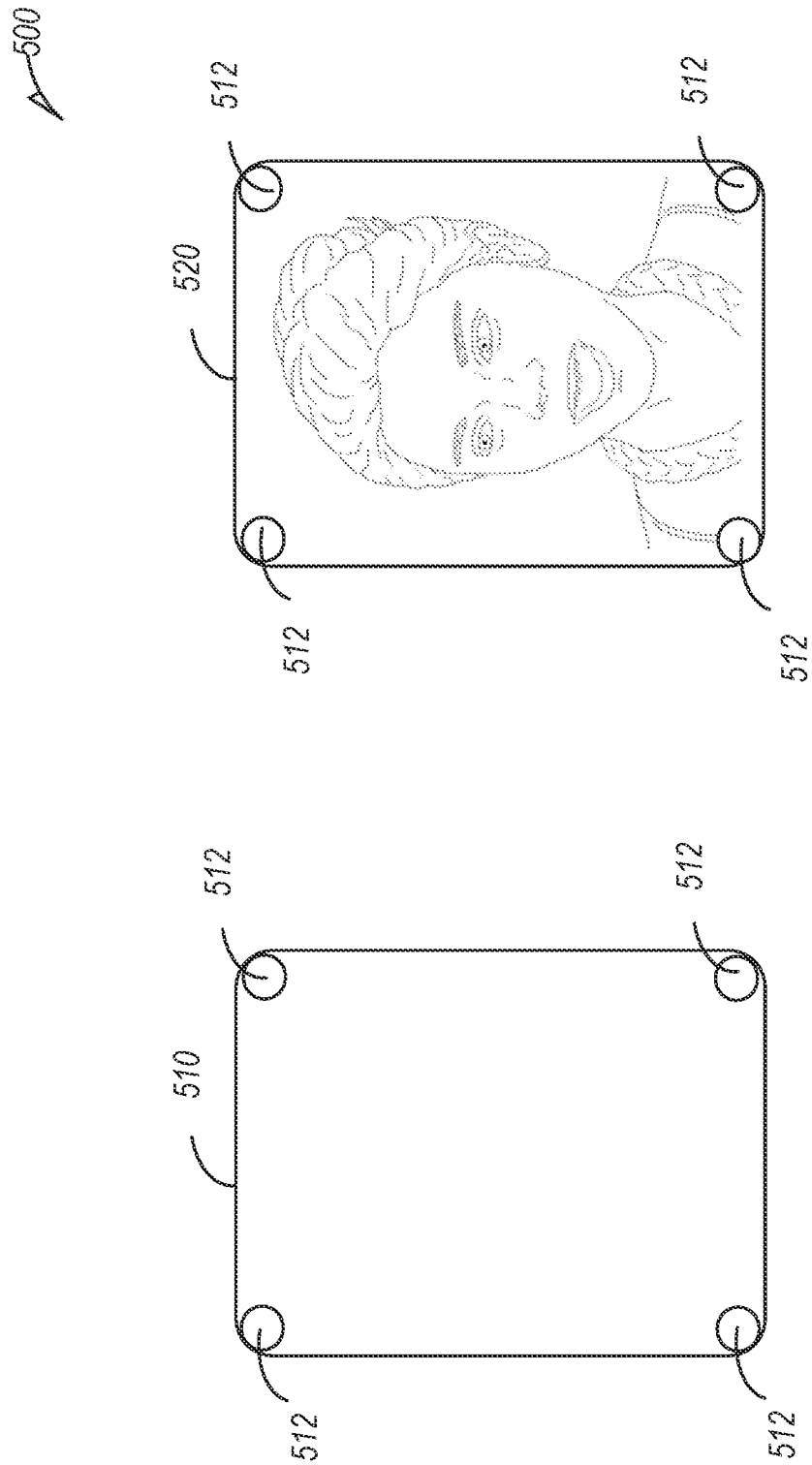
FIG. 5 illustrates views of a physical canvas, in accordance with some examples.

FIG. 5 is a diagram 500 that illustrates views of a physical canvas. View 510 is a view of a blank physical canvas and four markers 512 attached to the four corners of the physical canvas. The markers 512, in some examples, are physically attached to the corners of the physical canvas and depict a previously generated QR code that include instructions for calculating the plane and boundaries of the surface of the physical canvas, using four reference points.

View 520 is a view of the physical canvas as seen by a user wearing AR glasses, in which the viewer sees the physical canvas with a source image depicting a human face appearing as projected onto the physical canvas. This effect is achieved by combining transparent lenses with digital displays and displaying the source image on the digital display at a position that has been determined based on the plane and boundaries of the physical canvas, which have been calculated based on the respective positions of the markers 512.

Figure 6:
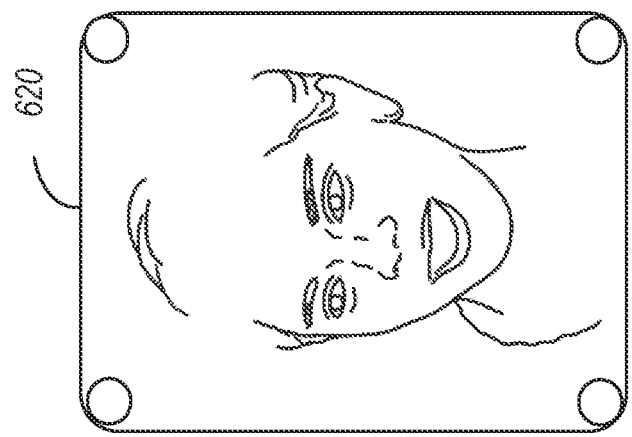
FIG. 6 illustrates further views of a physical canvas, in accordance with some examples.
Figure 6:
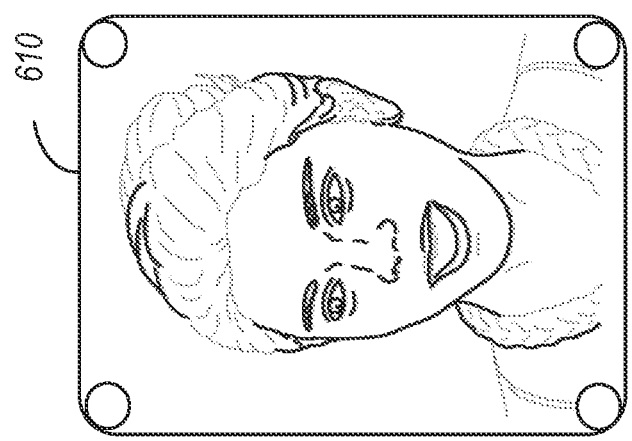

FIG. 6 is a diagram 600 that illustrates further views of a physical canvas. In a view 610, the physical canvas depicts the projected source image (that is shown by thinner lines) and a partial copy of the source image (that is shown by thicker lines). The partial copy of the source image is created by a physical medium on the physical canvas in the real world, such as by ink or pencil. A view 620 is of the physical canvas that depicts the partial copy of the source image created by a physical medium as seen without any digital overlay of the source image.

Figure 7:
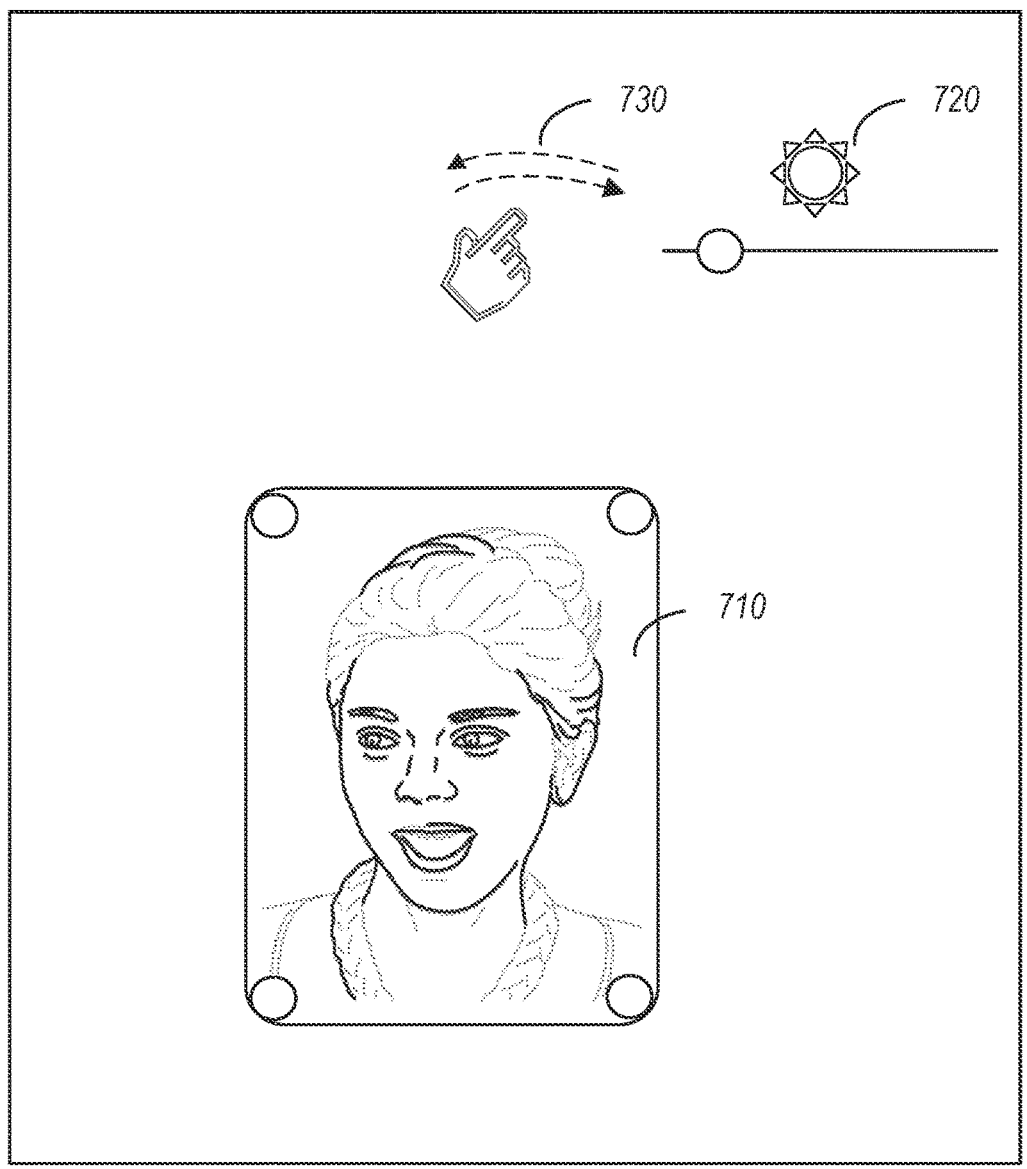
FIG. 7 illustrates a view as seen by a wearer of AR glasses that execute an image copying assistant, in accordance with some examples.

FIG. 7 is a view 700 as seen by a wearer of AR glasses that execute an image copying assistant. The view 700 includes, in area 710, the source image depicting the human face at the position determined based on the calculated plane and boundaries, and a partial copy of the source image (that is shown by thicker lines) created by a physical medium on the physical canvas. The view 700 also includes a brightness control 720 and a visual indication 730 intended to convey that the brightness control can be used to increase or decrease the brightness of the display using a hand gesture.

Machine Architecture

Figure 8:
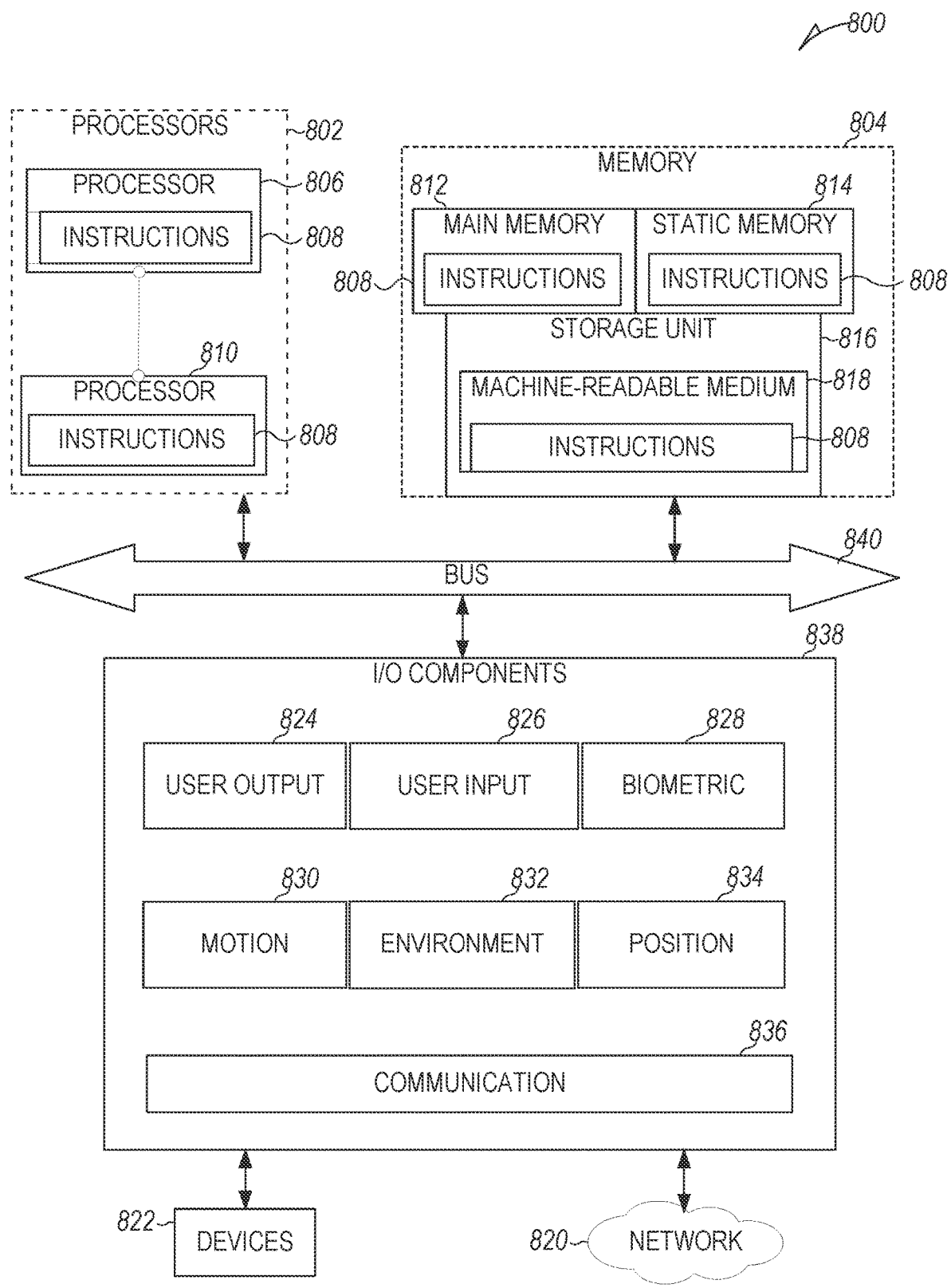
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 802, memory 804, and input/output I/O components 838, which may be configured to communicate with each other via a bus 840. In an example, the processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single-core, a single processor with multiple cores (e.g., a multi-core processor), multiple processors with a single core, multiple processors with multiples cores, or any combination thereof.

The memory 804 includes a main memory 812, a static memory 814, and a storage unit 816, both accessible to the processors 802 via the bus 840. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the Processor's cache memory), or any suitable combination thereof, during execution thereof by the machine 800.

The I/O components 838 may include a wide variety of components to receive input, provide output, produce output, transmit information, exchange information, capture measurements, and so on. The specific I/O components 838 that are included in a particular machine will depend on the type of machine. For example, portable machines such as mobile phones may include a touch input device or other such input mechanisms, while a headless server machine will likely not include such a touch input device. It will be appreciated that the I/O components 838 may include many other components that are not shown in FIG. 8. In various examples, the I/O components 838 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the 1/O components 838 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 3600 photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 838 further include communication components 836 operable to couple the machine 800 to a network 820 or devices 822 via respective coupling or connections. For example, the communication components 836 may include a network interface Component or another suitable device to interface with the network 820. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 812, static memory 814, and memory of the processors 802) and storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed examples.

The instructions 808 may be transmitted or received over the network 820, using a transmission medium, via a network interface device (e.g., a network interface component included in the communication components 836) and using any one of several well-known transfer protocols (e.g., hypertext transfer protocol (HTTP)). Similarly, the instructions 808 may be transmitted or received using a transmission medium via a coupling (e.g., a peer-to-peer coupling) to the devices 822.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   detecting, by a computing device, in an output of a digital image sensor of a camera of the computing device, copies of a visual marker;
   calculating a plane and boundaries of a physical canvas represented in the output of the digital image sensor based on the detected copies of the visual marker;
   determining a position on a digital display of the computing device for overlaying a source image; and
   causing displaying of the source image on the digital display at the determined position, wherein the determined position corresponds to the calculated plane and boundaries of the physical canvas, such that the source image, when caused to be displayed, appears to be projected onto the physical canvas.

2. The method of claim 1, wherein the computing device is augmented reality glasses.

3. The method of claim 1, comprising generating the visual marker in a form of a quick response (QR) code.

4. The method of claim 3, wherein the QR code comprises instructions for calculating a plane of a surface based on a number of points.

5. The method of claim 1, wherein a number of copies of the visual marker is four.

6. The method of claim 1, further comprising causing displaying, on the digital display of the computing device, a user-selectable element activatable to change brightness of the source image.

7. The method of claim 6, comprising configuring the user-selectable element to be activated in response to a gesture or a voice command detected at the computing device.

8. The method of claim 1, comprising uploading the source image to the computing device.

9. The method of claim 1, further comprising:
   determining that a period of time passed since the causing of the displaying of the source image on the digital display of the computing device; and
   in response to the determining, turning off the digital display of the computing device.

10. The method of claim 9, comprising turning the digital display on in response to a predetermined gesture or a voice command.

11. A system comprising:
one or more processors; and
a non-transitory computer readable storage medium comprising instructions that when executed by the one or more processors cause the one or more processors to perform operations comprising:
detecting, by a computing device, in an output of a digital image sensor of a camera of the computing device, copies of a visual marker;
calculating a plane and boundaries of a physical canvas represented in the output of the digital image sensor based on the detected copies of the visual marker;
determining a position on a digital display of the computing device for overlaying a source image; and
causing displaying of the source image on the digital display at the determined position, wherein the determined position corresponds to the calculated plane and boundaries of the physical canvas, such that the source image, when caused to be displayed, appears to be projected onto the physical canvas.

12. The system of claim 11, wherein the computing device is augmented reality glasses.

13. The system of claim 11, wherein the instructions include generating the visual marker in a form of a quick response (QR) code.

14. The system of claim 13, wherein the QR code comprises instructions for calculating a plane of a surface based on a number of points.

15. The system of claim 11, wherein a number of copies of the visual marker is four.

16. The system of claim 11, wherein the instructions include causing displaying, on the digital display of the computing device, a user-selectable element activatable to change brightness of the source image.

17. The system of claim 16, wherein the instructions include configuring the user-selectable element to be activated in response to a gesture or a voice command detected at the computing device.

18. The system of claim 11, wherein the instructions include uploading the source image to the computing device.

19. The system of claim 11, wherein the instructions further include:
determining that a period of time passed since the causing of the displaying of the source image on the digital display of the computing device; and
in response to the determining, turning off the digital display of the computing device.

20. A machine-readable non-transitory storage medium having instruction data executable by a machine to cause the machine to perform operations comprising:
detecting, by a computing device, in an output of a digital image sensor of a camera of the computing device, copies of a visual marker;
calculating a plane and boundaries of a physical canvas represented in the output of the digital image sensor based on the detected copies of the visual marker;
determining a position on a digital display of the computing device for overlaying a source image; and
causing displaying of the source image on the digital display at the determined position, wherein the determined position corresponds to the calculated plane and boundaries of the physical canvas, such that the source image, when caused to be displayed, appears to be projected onto the physical canvas.

* * * * *